United States Patent [19]
Stewart et al.

[11] Patent Number: 5,161,762
[45] Date of Patent: Nov. 10, 1992

[54] VEHICLE CARGO CLAMP

[76] Inventors: Peter V. Stewart, 204 Washington Grove La., Gaithersburg, Md. 20877; David R. Butts, 803 Bowie Rd., Rockville, Md. 20855

[21] Appl. No.: 787,544

[22] Filed: Nov. 4, 1991

Related U.S. Application Data

[62] Division of Ser. No. 546,263, Jun. 29, 1990, Pat. No. 5,082,404.

[51] Int. Cl.$^5$ ............................................. A47B 96/06
[52] U.S. Cl. ............................. 248/231.5; 248/316.5; 269/203; 211/43; 403/373; 24/514; 24/527; 224/325; 410/127
[58] Field of Search ............... 410/121, 126, 127, 128, 410/130, 143, 144, 145, 146, 147, 148, 149, 150, 152, 153; 224/311, 323, 325; 294/85, 103.1; 211/43, 51, 175; 269/203, 239; 248/231.5, 316.5; 403/290, 373; 24/514, 527, 569

[56] References Cited

U.S. PATENT DOCUMENTS

| 567,157 | 9/1896 | Noyes | 248/231.5 X |
|---|---|---|---|
| 722,349 | 3/1903 | Young | 248/231.5 X |
| 952,473 | 3/1910 | Shaw et al. | 269/239 X |
| 1,288,112 | 12/1918 | Minnis | 269/203 X |
| 1,363,020 | 12/1920 | Shewalter | 269/203 X |
| 1,998,597 | 4/1935 | Stuart | 269/203 X |
| 2,144,140 | 1/1939 | Batcheller | 24/514 |
| 3,032,849 | 5/1962 | Cohen et al. | 24/569 |
| 3,338,540 | 8/1967 | Barish | 248/316.5 X |
| 3,487,945 | 1/1970 | Barham | 211/43 |
| 3,554,416 | 1/1971 | Bott | 224/42.1 |
| 4,256,425 | 3/1981 | Burgess et al. | 410/149 |
| 4,439,076 | 3/1984 | Loomis et al. | 410/153 |
| 4,502,619 | 3/1985 | Cox | 224/311 |
| 4,733,842 | 3/1988 | Wilkerson | 248/231.5 X |

FOREIGN PATENT DOCUMENTS

| 342599 | 10/1921 | Fed. Rep. of Germany | 269/239 |
|---|---|---|---|
| 701096 | 1/1941 | Fed. Rep. of Germany | 211/43 |
| 578588 | 9/1924 | France | 269/203 |
| 317502 | 2/1935 | Italy | 248/231.5 |
| 1601937 | 11/1981 | United Kingdom | 403/373 |

Primary Examiner—Michael S. Huppert
Assistant Examiner—Robert S. Katz
Attorney, Agent, or Firm—A. Fred Starobin

[57] ABSTRACT

A cargo clamp for a van, the van having cargo space defined by a floor, upwardly extending sidewalls and a roof. The cargo clamp comprises a transverse track that extends between the sidewalls below the roof and is supported below the roof and is held in place by side rails on each side. A clamp is attached to the track and is movable along the side rails between the sidewalls. The clamp also includes a downwardly extending brace that engages and restrains sheet material that is positioned on edge in the cargo space. The clamp includes a handle and bolt for engagement in a threaded hole for securing the clamp to the track at a selected position.

6 Claims, 2 Drawing Sheets

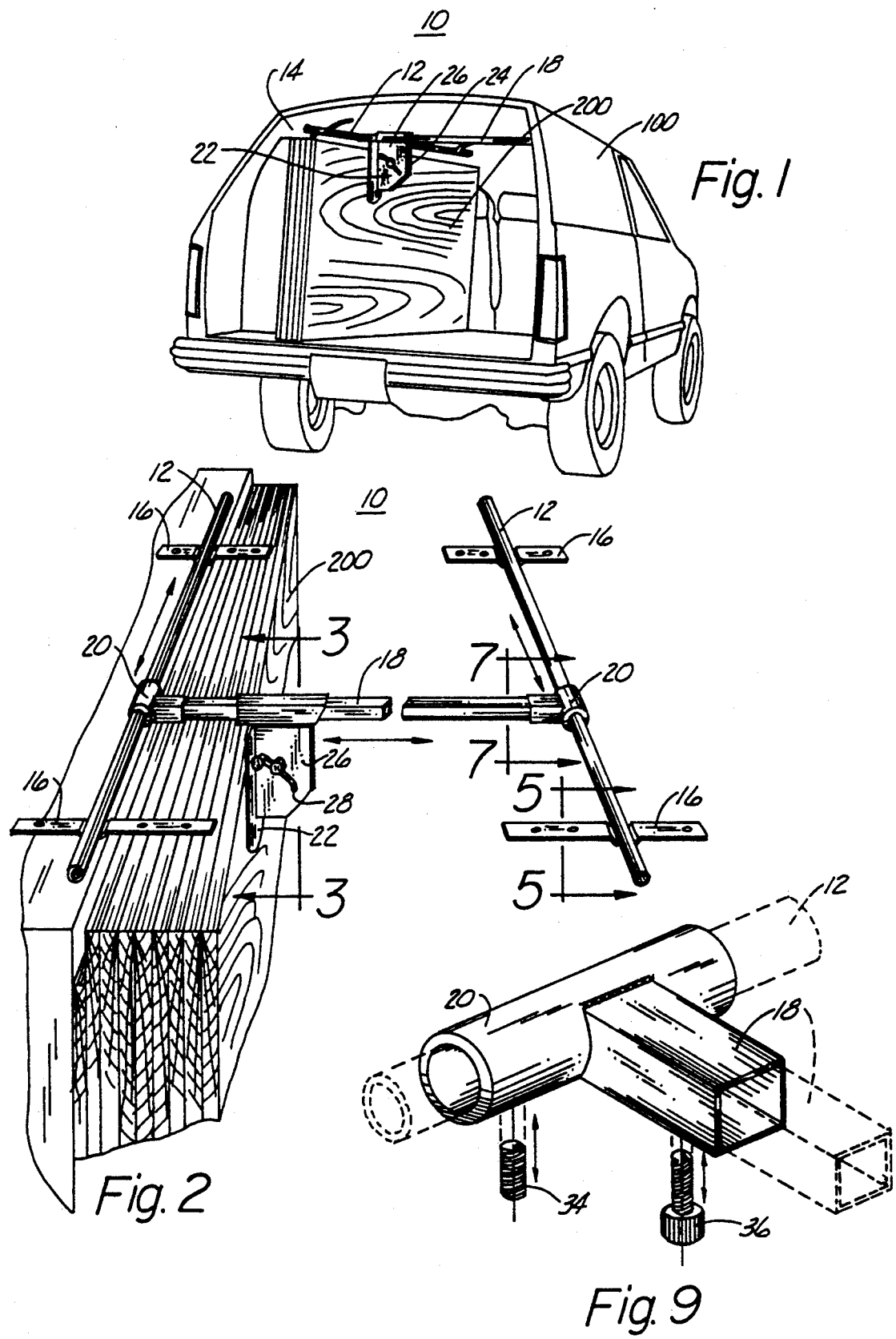

5,161,762

VEHICLE CARGO CLAMP

This is a division of application Ser. No. 07/546,263 filed Jun. 29, 1990, now U.S. Pat. No. 5,082,404.

TECHNICAL FIELD

This invention relates to cargo securing devices for vehicles, and more particularly to a clamp that allows for transport of sheet material on edge.

BACKGROUND ART

There are many devices known for securing cargo either within or on top of a vehicle. The problems associated with top mounted cargo carriers are they are very difficult to load, especially if the cargo is large and cumbersome. Usually it takes more than one individual to load and unload a top carrier when the cargo is large. Also the weather plays an important part in deciding whether to utilize a top mounted carrier. Rain and wind can damage the load, as well as unsecuring it and making it difficult to steer the vehicle in high wind. When using a van or the like for carrying large and cumbersome materials, such as sheet material, if there is equipment already loaded in the interior of the van, the contents must first be removed to aid in loading the cargo, then one must again reload the contents. All of the above mentioned problems require additional time and manpower for loading and unloading cargo.

Those concerned with these and other problems recognize the need for an improved van cargo clamp.

DISCLOSURE OF THE INVENTION

The present invention provides a cargo clamp for a van, the van having cargo space defined by a floor, upwardly extending sidewalls and a roof. The cargo clamp comprises a transverse track that extends between the sidewalls below the roof and is supported below the roof and is held in place by side rails on each side. A clamp is attached to the track and is movable along the side rails between the sidewalls. The clamp also includes a downwardly extending brace that engages and restrains sheet material that is positioned on edge in the cargo space. The clamp includes means for securing the clamp to the track at a selected position.

An object of the present invention is the provision of an improved cargo clamp.

Another object is to provide a cargo clamp that allows for transport of sheet material on edge.

A further object of the invention is the provision of a cargo clamp that allows for transport of sheet material on edge without first having to unload contents of a vehicle in the cargo area.

Still another object is to provide a cargo clamp that is simple to use.

A still further object of the present invention is the provision of a cargo clamp that allows for safely transporting sheet material on edge, while being firmly held in place.

A still further objective is the provision that the clamp, when not in use, can be removed from the track and be stored out of the way.

A still further objective is that because of the design of the mounting bracket, the clamp can be installed in any make van.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the cargo clamp of the present invention showing its attachment in the interior of a van with sheet material being disposed on edge and clamped in place by the clamp;

FIG. 2 is a cut away partial perspective view of the present invention showing the mounting straps and transverse track, side rails and the clamp holding sheet material in place;

FIG. 9 is an exploded perspective view of the T bracket showing the bolt and set screw for securing the T bracket in a stationary position.

BEST MODE FOR CARRYING OUT THE INVENTION

Figure 3:
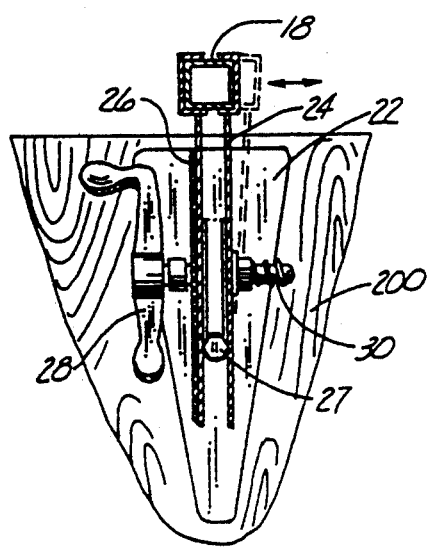
FIG. 3 is an end sectional view taken along line 3—3 of FIG. 2 showing the pivotal attachment of the side plates and the drawing mechanism that controls the relative position sof the upper sections of the side plates.

Referring now to the drawings, wherein like reference numerals designate identical or corresponding parts throughout the several views, FIG. 1 shows the cargo clamp (10) installed in the interior of a van (100). As best shown in FIG. 2, the cargo clamp (10) includes side rails (12) secured to struts (13) of the roof (14) of a van (100). Side rails (12) are secured to the roof (14) at each end by straps (16). Straps (16) are pre-drilled and held in place by fasteners well known in the art. A transverse track (18) extends between the side rails (12) and is held in place by T brackets (20). Each of the T brackets (20) slidably engage the respective side rail (12). Bolts (36) and set screws (34) secure the side rails (12) in the straps (16), and secure the T brackets (20) to the track (18) and the side rails (12).

Figure 4:
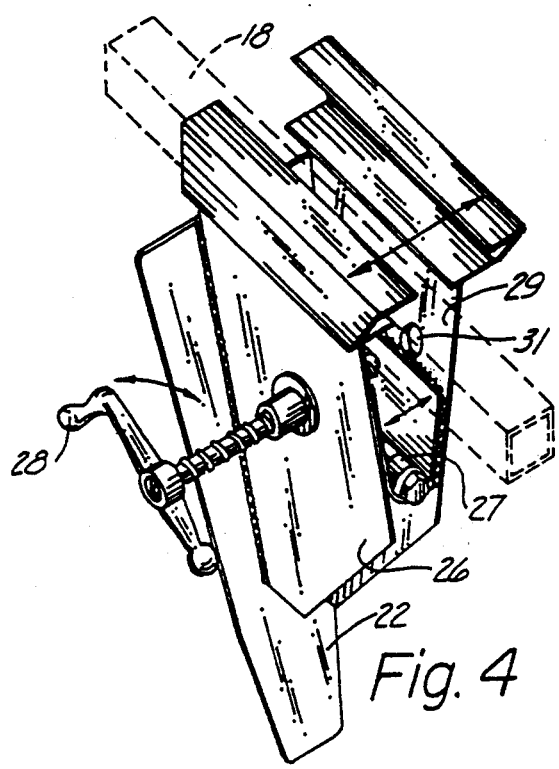
FIG. 4 is a perspective view of the clamp attached, the transverse track being shown in dashed line.
Figure 5:
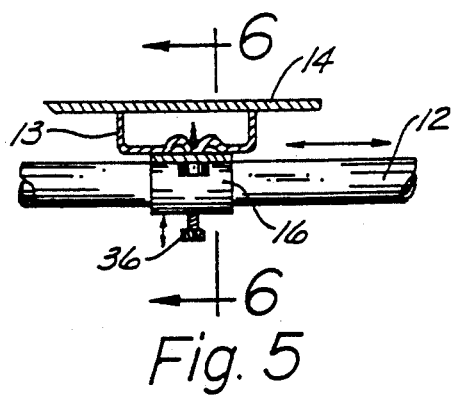
FIG. 5 is a side elevational view taken along line 5—5 of FIG. 2 showing the mounting strap in place securing one end of a side rail to a strut supporting the van roof.
Figure 6:
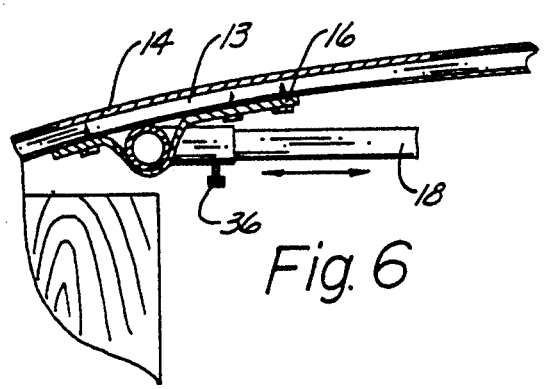
FIG. 6 is an end elevational view taken along line 6—6 of FIG. 5 showing the mounting strap attachment to the roof strut of a van.
Figure 7:
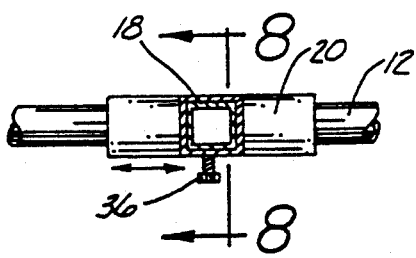
FIG. 7 is a side elevational view taken along line 7—7 of FIG. 2 showing the T bracket attachment of the present invention slidingly engaged on the side rail.
Figure 8:
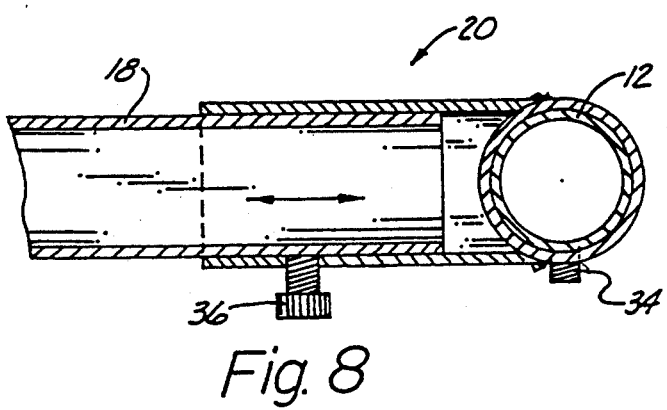
FIG. 8 is an end sectional view taken along line 8—8 of FIG. 7 showing the attachment of the T bracket to interconnect the transverse track and one of the side rails.

Referring now to FIGS. 2, 3 and 4, the cargo clamp (10) further includes a cargo brace (22) for holding sheet material (200) on edge during transport. Attached to the cargo brace (22) is a first side plate (26) which is rigidly attached to the cargo brace (22) and the upper section thereof slidingly engages track (18). A second side plate (24) is pivotally attached to the first side plate (26) by a hinge (27). The upper section of the second side plate (24) slidingly engages track (18) as well. A handle (28) is attached to threaded bolt (30) which engages a threaded opening (32) in the second side plate (24) to selectively draw the upper sections of the side plates (24, 26) together to secure the clamp against movement with respect to the track (18).

In use, handle (28) is turned counter-clockwise to draw bolt (30) from threaded opening (32) in side plate (24) and allow the upper sections of the side plates (24, 26) to open as ilustrated in the dashed line showing of FIG. 3. The clamp is then moved to one side of the van (100) along track (18) to allow for loading of sheet material (200). Sheet material (200) is loaded into the cargo area of van (100). After loading sheet material (200), the T brackets (20) and the attached track (18) are slid along side rails (12) to properly place the cargo brace (22) in position. The cargo brace (22) is then slid along the track (18) until it is positioned snugly up against material (200). The handle (28) is turned clockwise and bolt (30) engages the threaded hole (32) in the side plate (24) to draw the upper sections of the side plates together to securely hold the clamp against movement along track (18).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

We claim:

1. A cargo clamp for securing a load in a cargo space comprising
    a cargo brace being a plate having a front surface for pressing against a load;
    a first side plate with edges, said first plate defining a first plane and having a first upper clamping section;
    a second side plate with edges, said second plate defining a second plane and attached for pivotal movement about an axis parallel to said first plate and relative to said first side plate and movable between a first unclamped position and a second clamped position, and having a second upper clamping section;
    said cargo brace rigidly secured to a front edge of at least one of said side plates;
    said front surface of said cargo brace attached to said edge of said at least one of said side plates in a direction substantially perpendicular to the plane of said at least one of said side plates and positioned to receive a substantially horizontal force perpendicular to said front surface in a direction into said front edge and parallel to the plane of said at least one of said side plates;
    and means for providing said pivotal movement for drawing said first and second upper sections toward each other in a clamping movement of said first and second upper clamping sections connecting between said side plates.

2. The cargo clamp of claim 1 wherein
said means for providing said pivotal movement includes
    a threaded bolt disposed to extend through an opening in said first side plate and engage a threaded opening in said second side plate,
    and a handle attached to said bolt adjacent said first side plate.

3. The cargo clamp of claim 1 wherein
said front surface of said cargo brace extends substantially vertically downward.

4. The cargo clamp of claim 1 wherein
said first and second upper clamping sections are complementary shaped to fit around a support in the clamping movement.

5. The cargo clamp of claim 1 wherein
said means for providing said pivotal movement includes
    hinge means integrally attached to each of said first and second side plates.

6. The cargo clamp of claim 5 wherein
said hinge means connects said side plates at lower ends of said side plates.

* * * * *